June 23, 1964
H. JENSEN
3,138,390
ROTARY SEAL WITH ANNULAR BEAD
Filed Nov. 15, 1960
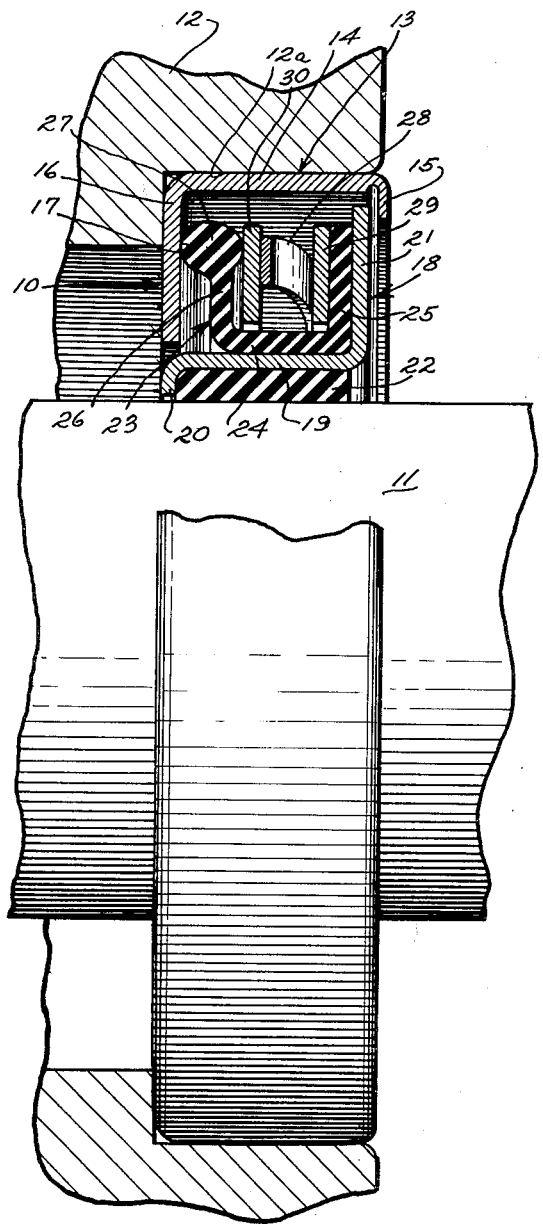
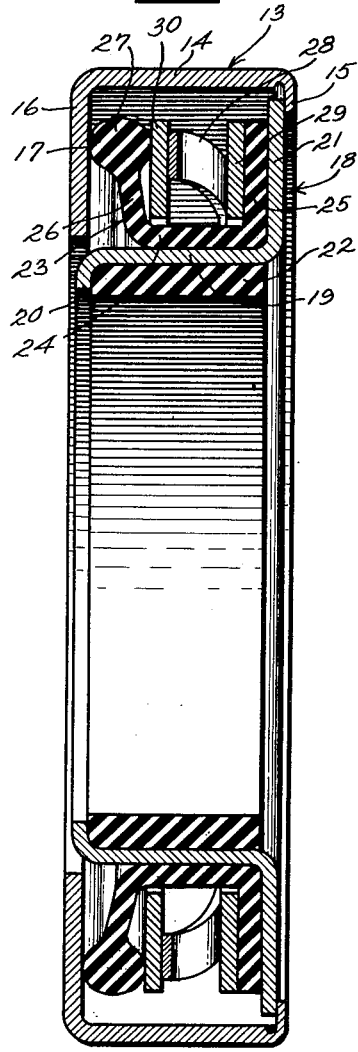
INVENTOR.
Hans Jensen
BY
Hill, Sherman, Meroni, Gross & Simpson
ATTORNEYS

United States Patent Office 3,138,390
Patented June 23, 1964

3,138,390
ROTARY SEAL WITH ANNULAR BEAD
Hans Jensen, Wheeling, Ill., assignor to Gits Bros. Mfg.
Co., Chicago, Ill., a corporation of Illinois
Filed Nov. 15, 1960, Ser. No. 69,335
5 Claims. (Cl. 277—42)

The present invention relates to improvements in rotary seals and particularly to a rotary seal of simplified construction which will provide a wearing seal between parts such as a stationary housing and a rotating shaft.

The invention contemplates the provision of a rotary seal having a stationary casing ring for supporting in a housing and having an inturned flange to provide a radial annular sealing face. A rotatable carrier ring is secured on a shaft and carries a U-shaped sealing ring formed of a non-rigid yieldable material. The carrier ring has an outwardly extending flange against which one side of the sealing ring is positioned. The other side of the sealing ring supports an annular bead which sealingly engages the sealing face of the casing ring. An annular spring expands axially outwardly to sealingly hold the one side of the sealing ring against the flange of the carrier ring and the annular bead in sealing relatively rotational engagement with the sealing face of the casing ring.

An object of the present invention is to provide an improved rotary seal of simplified construction that can be simply made of few parts and wherein the parts can be inexpensively made of rolled or pressed metal.

A further object of the invention is to provide a simplified lightweight compact rotary seal which can be removably fit over a rotating shaft member.

A still further object of the invention is to provide a compact lightweight rotary seal using metal-to-rubber sealing surfaces to obtain good sealing properties.

Other objects and advantages will become more apparent with the teaching of the principles of the present invention in connection with the disclosure of the preferred embodiment thereof in the specification, claims and drawings, in which:

FIGURE 1 is an elevational view shown partly in section of a rotary seal which is constructed in accordance with the principles of the present invention in operating position on a shaft; and FIGURE 2 is an elevational view shown partly in section of the seal of FIGURE 1 as it appears before installation on a shaft.

As shown on the drawings:

A rotary sealing unit 10 is shown in FIGURE 1 with the parts in operational position and the sealing unit 10 mounted on a shaft. The unit 10 is positioned between a rotary shaft member 11 and a stationary housing 12. The rotary seal includes a casing ring 13 preferably formed of rolled metal so as to be shaped to include an outer cylindrical portion 14 with an inwardly turned first flange 15 at one end and an inwardly turned second flange 16 at the other end. The flange 16 has an inwardly facing radial annular sealing surface 17 which is smooth to provide an effective non-wearing hard sealing surface.

The other parts of the seal are carried in rotation on the shaft. A carrier ring 18 has a cylindrical portion 19 with an inwardly turned lip 20 and an outwardly turned spring backing flange portion 21. This flange portion extends beyond the inner edge of the flange 15 of the casing ring and, as shown in FIGURE 2, the flange 21 will engage the flange 15 so as to prevent separation of the parts when the sealing unit 10 is not mounted on a shaft.

The carrier ring is suitably mounted on the shaft and may be press fit thereon. As shown it is firmly supported on a supporting rubber gasket mounting ring 22 which expands against the portion 19 of the carrier ring and against the shaft with sufficient force to support the carrier ring and prevent it from sliding axially. Axial movement must be prevented and the carrier ring is slid sufficiently far on the shaft so that there is no rubbing engagement between the flanges 21 and 15. The casing ring 13 is firmly held against axial movement by being set in a socket 12a in the housing.

The carrier ring carries a sealing ring 23 which is U-shaped and formed of a flexible resilient material such as high carbon rubber. The sealing ring has a cylindrical portion 24 which conveniently rests on the cylindrical portion 19 of the carrier ring to maintain the sealing ring in a supported coaxial position. The sealing ring has a radially outwardly extending side 25 which rests against the inner surface of the flange 21 of the carrier ring. The sealing ring has a side 26 at the other end and at the outer edge of this side is an annular bead 27 which is integral with the sealing ring and formed of the same material. This bead provides a rounded annular face for sealingly engaging the sealing face 17 of the casing ring.

Between the sides of the U-shaped sealing ring is an annular axially expanding wave spring 28. The wave spring presses the first side 25 of the sealing ring against the retaining flange 21 of the carrier ring and a backing ring or washer 29 is positioned between the spring and the side 25. Another annular spring backing ring or washer 30 is positioned between the spring 38 and the annular bead 27, and at this end, the spring holds the bead 27 in sealing relationship with the face 17.

As shown, the sealing ring 23, coacting with the spring 28, forms a stationary seal at one side 25 and a relatively rotating seal at the other side 26, with the remaining portion 24 of the sealing ring preventing leakage between the two sides. The sealing ring thus provides a complete and effective seal between the casing ring and carrier ring.

The bead 27 is slightly deformable with the pressure of the spring 28 and is held in good sealing engagement with the sealing surface 17. It is held in a coaxial position by the side 26 of the U-shaped sealing ring. At high speeds, it is possible that the bead may flatten slightly due to centrifugal force but the continual biasing action of the spring 28 will always maintain the bead in reliable sealing engagement with the surface 17, and the formation of the bead insures that a sealing engagement will be maintained at all annular locations around the surface 17. With the development of increased temperature due to friction, glazing of the sealing face of the bead 27 may occur to increase the wearing life of the rubber bead.

In operation, the seal of FIGURE 2 is installed over a shaft 11, as shown in FIGURE 1, by sliding the casing ring 13 in the socket 12a in the housing 12 and moving the carrier ring 18 and its mounting ring 22 over the shaft and sliding it an additional small axial distance to separate the flanges 15 and 21. The seal is then in position for operation and the U-shaped sealing ring 23 and the spring 28 will rotate with the carrier ring 18 on the shaft 11.

Thus it will be seen that we have provided an improved rotary seal which meets the objectives and advantages above set forth. The seal is formed of few parts, is lightweight and is compact. It is inexpensive to manufacture and maintain and employs a rubber-to-metal sealing surface for obtaining effective sealing properties.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. A rotary seal comprising a casing ring for being supported in a housing and having an outer cylindrical portion with an inwardly turned retaining flange at one end and an inwardly turned sealing flange at the other end having a radial sealing face, a carrier ring for rotation with a shaft member having an outwardly turned spring backing flange projecting beyond the inner edge of said retaining flange, a yieldable mounting ring on the carrier ring for mounting on the shaft member, a U-shaped sealing ring of a non-rigid material with a first radial side against an inner surface of said spring backing flange and a second radial side adjacent said radial sealing face of the casing ring, an annular bead carried on said second side of the sealing ring having a rounded convex outer surface to sealingly engage said radial sealing face, said second side forming an outwardly extending support which pivots about its radial inner edge where it is connected to the base of the U-shaped ring with said rounded surface being substantially in line engagement with the radial sealing face, a spring positioned between the first and second sides of the sealing ring, and annular spring end rings between the ends of the spring and said sides of the sealing ring clamping the first side against the carrier ring flange and holding said annular bead against said sealing face of the sealing flange.

2. A rotary seal comprising a casing ring for being supported in a housing and having an outer cylindrical portion with an inwardly turned retaining flange at one end and an inwardly turned sealing flange at the other end having a radial sealing face, a carrier ring for rotation with a shaft member having an outwardly turned spring backing flange projecting beyond the inner edge of said retaining flange, a U-shaped sealing ring of a non-rigid material with a first radial side against an inner surface of said spring backing flange and a second radial side adjacent said radial sealing face of the casing ring, an annular bead carried on said second side of the sealing ring and having a rounded convex surface to sealingly engage said radial sealing face and being relatively rotatable with respect thereto, said second side forming an outwardly extending support which pivots about its radial inner edge where it is connected to the base of the U-shaped ring with said rounded surface being substantially in line engagement with the radial sealing face, and a spring positioned between the first and second sides of the sealing ring to hold the sealing ring bead against the sealing face of a sealing flange and to hold the first side of the sealing ring against the spring backing flange, said spring backing flange engaging said retaining flange to hold the parts of the seal assembled when not carried on a shaft member.

3. A rotary seal comprising a stationary first sealing member having an annular sealing face, a rotatable second sealing member having a radially extending portion and an annular bead of flexible material at the outer edge of the radial portion with a rounded convex surface in sealing engagement with said face with said radially extending portion providing a pivotal support for the bead so that the rounded convex surface will engage said sealing face in substantially line contact irrespective of the pivotal position of the radially extending portion, a carrier ring for supporting the second sealing member on a shaft member, and an axially extensible spring means engaging said bead and urging said bead and said sealing face into sealing engagement.

4. A rotary seal comprising a stationary first sealing member having an annular sealing face formed of a hard non-wearing material, a rotatable second sealing member having an annular outer bead portion with a rounded resilient sealing face formed of a softer relatively faster wearing material for sealing engagement with the face of said first member, said second member having an annular radially outwardly extending side portion supporting the bead portion at its outer edge and fixedly supported at its radial inner edge on a rotatable shaft member so that a hinge support is provided for said bead portion and the bead portion engages the sealing surface in line contact regardless of the pivotal position of the side portion, means on said second member for mounting the side portion on the rotatable shaft member, and means for urging said bead portion against said first member to hold said faces in sealing engagement.

5. A rotary seal comprising a casing ring for being supported in a housing and having a radial sealing face, a carrier ring for rotation with a shaft member having a spring backing portion, a U-shaped annular integral one-piece sealing ring of a flexible material with a first side against the spring backing portion of the carrier ring and a second radial side having an annular bead of circular cross section relatively rotatably engaged against said sealing face, an annular axially extensible spring between the sides of said sealing ring for urging one side into sealing engagement with said portion of the carrier ring and for urging the other side into relatively rotating sealing engagement with said sealing face of the casing ring, said sealing ring preventing the flow of fluid between said casing ring and said carrier ring, and a washer having a flat surface engaging the rear surface of said bead permitting the bead to roll against the washer with pivotal movement of said second side.

References Cited in the file of this patent

UNITED STATES PATENTS

| 2,472,257 | Matter | June 7, 1949 |
| 2,916,313 | Ziller et al. | Dec. 8, 1959 |

FOREIGN PATENTS

| 591,522 | Great Britain | Aug. 20, 1947 |
| 761,815 | Great Britain | Nov. 21, 1956 |
| 464,974 | Canada | May 9, 1950 |